United States Patent
Prakah-Asante et al.

(10) Patent No.: US 11,783,708 B2
(45) Date of Patent: Oct. 10, 2023

(54) USER-TAILORED ROADWAY COMPLEXITY AWARENESS

(71) Applicant: Ford Global Technologies, LLC, Dearborn, MI (US)

(72) Inventors: Kwaku O. Prakah-Asante, Commerce Township, MI (US); Jian Wan, Novi, MI (US); Jayanthi Rao, West Bloomfield, MI (US); Prayat Anil Hegde, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 17/316,689

(22) Filed: May 10, 2021

(65) Prior Publication Data
US 2022/0375342 A1   Nov. 24, 2022

(51) Int. Cl.
G08G 1/0967 (2006.01)
G08G 1/0968 (2006.01)
G08G 1/01 (2006.01)
G06T 11/00 (2006.01)

(52) U.S. Cl.
CPC ..... *G08G 1/096783* (2013.01); *G08G 1/0116* (2013.01); *G08G 1/09675* (2013.01); *G08G 1/096725* (2013.01); *G08G 1/096827* (2013.01); *G08G 1/096838* (2013.01); *G08G 1/096855* (2013.01); *G06T 11/00* (2013.01)

(58) Field of Classification Search
CPC .......... G08G 1/096783; G08G 1/0116; G08G 1/096725; G08G 1/09675; G08G 1/096827; G08G 1/096838; G08G 1/096855; G06T 11/00
See application file for complete search history.

(56) References Cited

U.S. PATENT DOCUMENTS

| | | | |
|---|---|---|---|
| 7,167,779 B2 * | 1/2007 | Kashiwada | G02B 27/0101 701/1 |
| 7,561,966 B2 * | 7/2009 | Nakamura | G01C 21/365 345/581 |
| 7,797,108 B2 | 9/2010 | Grimm | |
| 8,204,642 B2 | 6/2012 | Tanaka et al. | |

(Continued)

OTHER PUBLICATIONS

Ashley, "Smart cars and automated highways", Mechanical Engineering, vol. 120, Issue 5, May 1998, 5 pages.

*Primary Examiner* — Dale W Hilgendorf
(74) *Attorney, Agent, or Firm* — Brandon Hicks; Eversheds Sutherland (US) LLP (57) ABSTRACT

A roadway complexity awareness system for a vehicle, comprising a processor, an augmented reality interface disposed in communication with the processor, and a memory for storing executable instructions. The processor is programmed to execute the instructions to receive roadway status information from an infrastructure processor associated with a roadway, obtain, from a vehicle sensory system, sensory information indicative of roadway route complexity, and determine a likelihood of roadway route complexity based on the roadway status information and the sensory information. The system may select an augmented reality message indicative of the roadway route complexity, and generate the augmented reality message using an augmented reality interface device, wherein the augmented reality message is visible to a vehicle operator.

16 Claims, 5 Drawing Sheets

(56) References Cited

U.S. PATENT DOCUMENTS

| | | | |
|---|---|---|---|
| 8,412,413 B1* | 4/2013 | Stark | G02B 27/01 |
| | | | 359/13 |
| 9,403,482 B2* | 8/2016 | Shahraray | H04W 4/021 |
| 10,421,459 B2* | 9/2019 | Goldman-Shenhar | ......... |
| | | | B60W 50/14 |
| 10,607,416 B2* | 3/2020 | Nowakowski | G06T 19/006 |
| 10,682,911 B2* | 6/2020 | Candelore | B60K 35/00 |
| 2002/0008637 A1* | 1/2002 | Lemelson | G08G 1/07 |
| | | | 340/907 |
| 2008/0027636 A1* | 1/2008 | Tengler | G01C 21/3492 |
| | | | 701/425 |
| 2011/0187863 A1 | 8/2011 | Glander et al. | |
| 2017/0124869 A1* | 5/2017 | Popple | G08G 1/096783 |
| 2018/0005525 A1* | 1/2018 | Parundekar | G08G 1/0967 |
| 2019/0243371 A1 | 8/2019 | Nister et al. | |
| 2020/0017117 A1* | 1/2020 | Milton | B60W 50/02 |
| 2023/0095384 A1* | 3/2023 | Sharma Banjade | ......... |
| | | | G08G 1/096725 |
| | | | 701/301 |

* cited by examiner

USER-TAILORED ROADWAY COMPLEXITY AWARENESS

TECHNICAL FIELD

The present disclosure relates to infrastructure to vehicle communication systems, and more particularly, to an infrastructure to vehicle communication system user-tailored for roadway complexity awareness.

BACKGROUND

Appropriate awareness of roadway complexity including regulated shifts in lanes due to construction zones or barriers, is particularly important for convenience and user experience.

Complex situations encountered on the roadway may cause a driver to abruptly reduce vehicle speed if not provided appropriate guidance. Roadway complexity can include road construction, detours, temporary lane diversions, and other similar situations. Conventional systems for alerting drivers to dynamically changing roadway complexity include infrastructure-to-vehicle (I2V) communication sent to the vehicle from infrastructure computing systems associated with traffic barriers or lane shift signs to communicate location of upcoming roadway complexity. However, the user may not be made aware of the complex road conditions in an appropriate way that does not divert attention from vehicle operation. Moreover, conventional systems may not provide information tailored to the conditional state.

In addition, there are situations where drivers, including novice and advanced age drivers, may operate their vehicle in unfamiliar areas at night, or under difficult weather conditions, and may be less likely to judge approaching complex roadway areas requiring vehicle slow down or lane shifts. It may be advantageous to provide enhanced means for automated roadway complexity awareness that tailor messages and roadway information according to the vehicle, driver, and operational environment.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

The disclosure will be described more fully hereinafter with reference to the accompanying drawings, in which example embodiments of the disclosure are shown, and not intended to be limiting.

Figure 1:
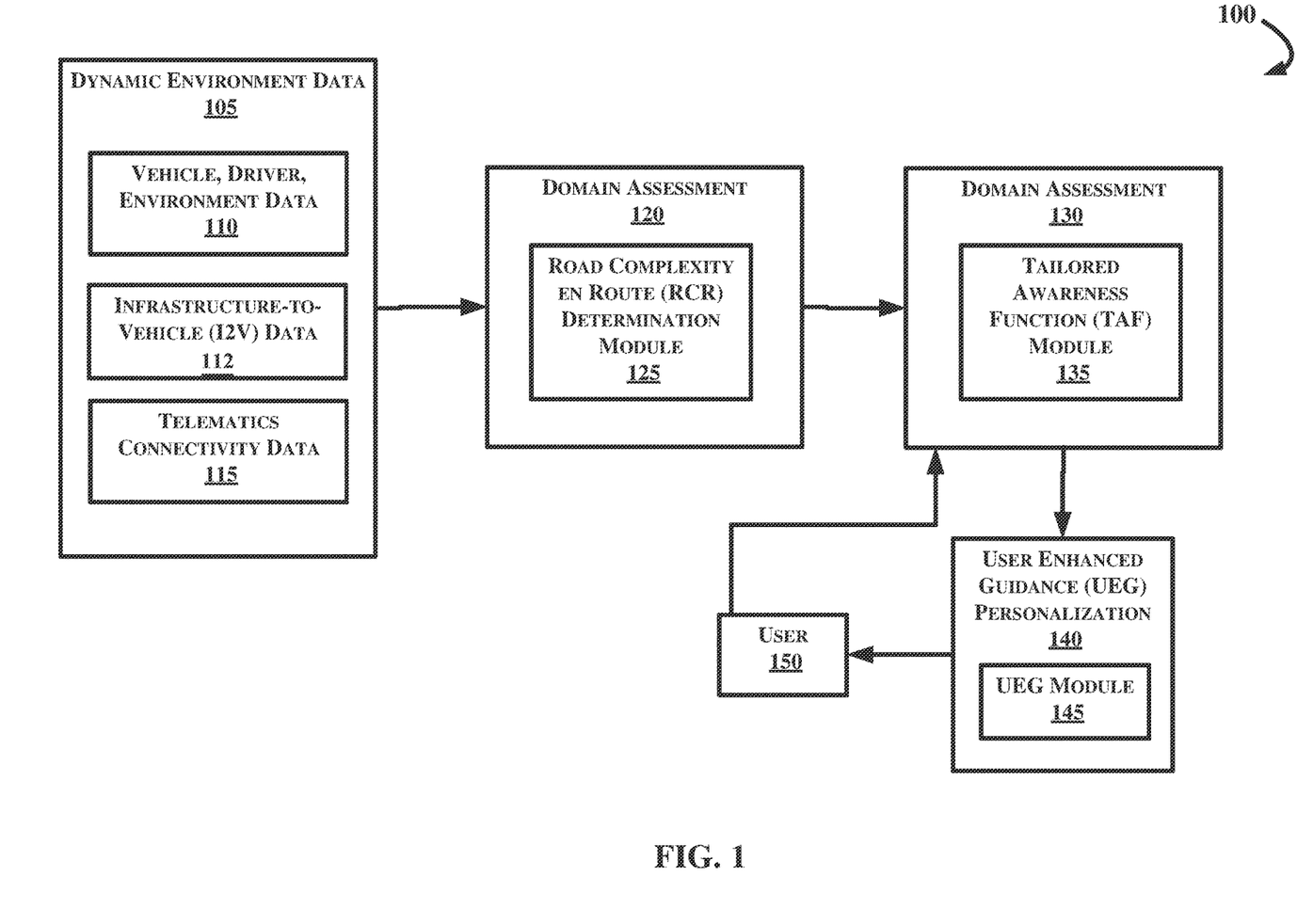
FIG. 1 depicts a functional schematic of a roadway complexity awareness system in accordance with the present disclosure.

FIG. 1 depicts a flow diagram illustrating a systematic process for generating and delivering roadway complexity messages to a vehicle user using a roadway complexity awareness system 100, in accordance with the present disclosure. The roadway complexity awareness system 100 can include a domain assessment block 120 that receives dynamic environment data 105, determines the presence of oncoming roadway complexity, and outputs the information to a domain assessment block 130 to generate user enhanced guidance (UEG) personalization at block 140 that generates output messages that are customized according to vehicle, driver, environmental factors. The messages may inform a user 150 of the approaching roadway complexity.

More particularly, the roadway complexity awareness system 100 may be configured and/or programmed to provide tailored user awareness for vehicle drivers. The domain assessment block 120 may include a Route Complexity en route (RCR) determination module 125 configured and/or programmed to determine situations where there may exist a likelihood of roadway complexity associated with barriers and lane shifts, and other events encountered on the roadway while driving.

The RCR determination module 125 may receive dynamic environment data 105 that can include vehicle, driver, and environment data 110, infrastructure-to-vehicle (I2V) data 112, and telematics connectivity data 115 obtained from vehicle and connected systems. In one embodiment, the roadway complexity awareness system 100 fuses the dynamic environment data 105, and assesses a likelihood of road complexity using a computational intelligence decision model configured and/or programmed to activate an input for graduated Augmented Reality awareness. The system further includes a User Enhanced Guidance (UEG) module that provides personalized guided augmented reality awareness.

The RCR determination module 125 may, based on the dynamic environment data 105, determine situations where there is a likelihood of roadway complexity associated with construction or other dynamic situations encountered while driving the vehicle using onboard sensors (e.g., a vehicle sensory system) and connectivity information received from the C-I2V data 110. For example, the C-I2V data be received by infrastructure having computing elements that send messages to nearby vehicles indicative of the presence of traffic barriers and road shifts on the roadway. In other aspects, the C-I2V data may include data associated with a vehicle collision, including information that identifies one or more traffic lanes that are open or not open for through traffic, traffic speed information, time estimates for clearing the roadway complexity, and other similar information.

According to other embodiments, the RCR determination module 125 can include computational intelligence that incorporates a multi-input computational approach to determine the likelihood of road complexity using information sensed by the vehicle sensory system. For example, the RCR determination module 125 may determine the time-to-roadway lane shifts or barriers using the telematics connectivity data 115 and/or the vehicle, driver, environment data 110, and obtain information about the time of day, weather conditions, and other factors to provide predictive information. The RCR determination module 125 may receive system inputs indicative of vehicle localization information and route information, and determine the likelihood of encountering the roadway complexity given the present or average vehicle speed received as part of the telematics connectivity data 115. The RCR determination module 125 may analyze relative positioning and route, and determine if the vehicle is approaching an area having known roadway complexity associated with the I2V data 112. The RCR determination module 125 may determine the proximity of the vehicle with respect to the road complexity, or based on a location of the sign indicating the road complexity, and/or based on the vehicle's closing velocity. The RCR determination module 125 may forward this information as output to the domain assessment block 130 for processing by the TAF module 135.

The TAF module 135 is a decision-making sub-system programmed and/or configured to provide input to the UEG personalization block (140) to determine appropriate guidance output to the vehicle driver (user 150). The guidance output can alert the user 150 with one or more automated awareness messages associated with the complex roadway. Example output can include an image of a roadway sign, speed variation instruction such as slow down ahead, merge right ahead, merge left in N meters, detour ahead, etc. In another embodiment, the output message may include an auditory indication that accompanies a visual indication. The visual and audio indication may be delivered using an augmented reality (AR) delivery system such as a heads-up display, and/or via a wearable AR device such as AR glasses or the like.

The TAF module 135 can determine and select a driver-specific and situation-specific form of messaging based on information obtained by the RCR determination module 125. For example, the TAF module 135 may track vehicle speed, vehicle location, and user 150 activity to determine appropriate user guidance, based on information received from the RCR determination module 125. The guidance may be the TAF applies one or more decision rules to determine the activation of the relevant AR rendering.

The TAF applies decision rules to determine and provide input to the UEG for the activation of the relevant AR rendering. For example a general rule may be of the form:

$$\text{If}(u_i > \text{RCR\_time} > w_i, \text{ and } V_{spd} \text{ is } > = x_i, \text{ and } y_i < \text{UA} < z_i) \quad (1)$$

$$\text{Then TAF\_output} = m_i \quad (2)$$

Where RCR_time is the computed tracked time to roadway complexity (obtained from the RCR). The variables $u_i$ and $w_i$ are tunable thresholds, for example 5 secs and 0.5 secs respectively. $V_{spd}$ is the vehicle speed, and $x_i$ is a selectable threshold, for example 10 kmph. UA is a user activity value (between 0-1, which may be determined based on accelerometer, steering, and brake actions, respectively). The variables $y_i$ and $z_i$ are selectable thresholds, for example, 0.3 and 0.7, respectively. The TAF_output $m_i$ is the output sent to the UEG personalization block 140. The value $m_i$ may include one of three values 1, 2, or 0, representing the user selected action should a decision for AR rendering be made. The value 1 represents that an AR rendering should be provided automatically, 2 indicates that a recommendation should be made, while 0 indicates that no AR rendering would be provided.

The UEG personalization block 140 functionally represents an augmented reality interface sub-system that utilizes a UEG module 145 to provide feedback to the user from information received from the TAF module 135. The UEG module 145 may provide a graduated feedback that can be personalized to the user for determining upcoming roadway complexity from barriers and lane shifts crossings. The UEG module 145 may provide personalized feedback according to the following logic:

$$UEG(pers.) = \begin{cases} \text{low} & \text{if } T2 < T\_RC \le T1 \\ \text{medium} & \text{if } T3 < T\_RC \le T2 \\ \text{high} & \text{if } \quad T\_RC \le T3 \end{cases} \quad (3)$$

where T1, and T2, and T3 are example Time to the Roadway Complexity (T_RC) thresholds that can be adjusted based on driver type and time-of-day; and UEG (pers.) is personalized user feedback having one of three values: low, which includes minimal AR rendering; medium which includes AR rendering and sound, and high which includes AR rendering, sound, and tactile feedback.

In one example embodiment, increased intensity from visual and additional elements may not be provided if the UEG module 145 determines that the user 150 is decelerating and responsive to observing the roadway complexity. In addition, an additional alert may be provided by the UEG module 145 responsive to determining that the threshold conditions of equation (3) are satisfied.

Figure 2:
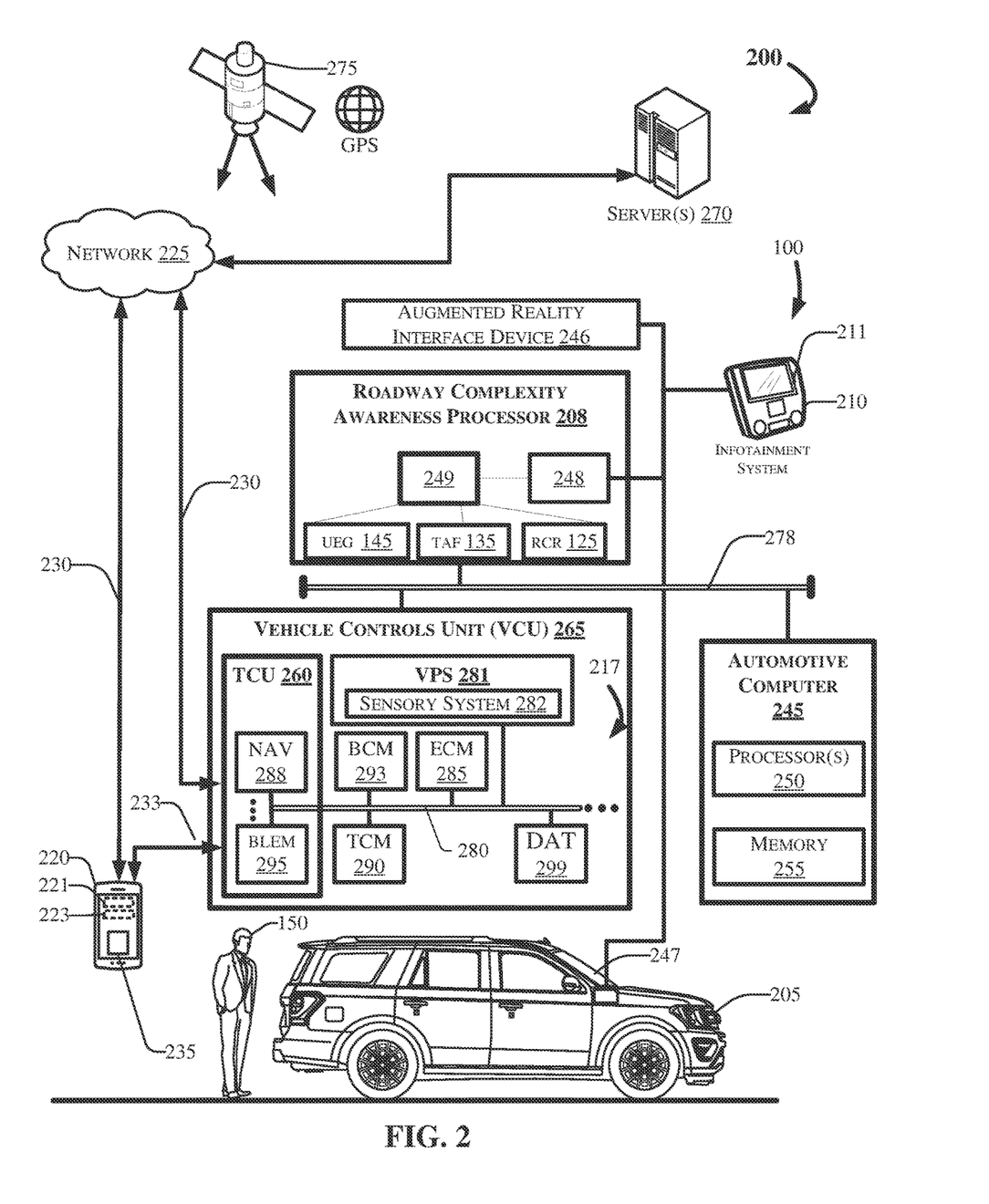
FIG. 2 illustrates an example computing environment in which techniques and structures for providing the systems and methods disclosed herein may be implemented.

FIG. 2 illustrates an example computing environment in which techniques and structures for providing the systems and methods disclosed herein may be implemented. More particularly, FIG. 2 depicts an example computing environment 200 that can include a vehicle 205. The vehicle 205 may include an automotive computer 245, a roadway complexity awareness processor 208 in communication with the automotive computer 245, and a Vehicle Controls Unit (VCU) 265 that can include a plurality of electronic control units (ECUs) 217 disposed in communication with the automotive computer 245 and/or the roadway complexity awareness processor 208. A mobile device 220, which may be associated with the user 150 and the vehicle 205, may connect with the automotive computer 245 using wired and/or wireless communication protocols and transceivers. The mobile device 220 may be communicatively coupled with the vehicle 205 via one or more network(s) 225, which may communicate via one or more wireless connection(s) 230, and/or may connect with the vehicle 205 directly using near field communication (NFC) protocols, Bluetooth® protocols, Wi-Fi, Ultra-Wide Band (UWB), and other possible data connection and sharing techniques. In one embodiment, and in addition to AR, the AR messages delivered via the processor 208, the mobile device 220 may also output one or more of the messages using a standard interface of the mobile device.

The vehicle 205 may also receive and/or be in communication with a Global Positioning System (GPS) 275. The GPS 275 may be a satellite system (as depicted in FIG. 2) such as the global navigation satellite system (GLNSS), Galileo, or navigation or other similar system. In other aspects, the GPS 275 may be a terrestrial-based navigation network. In some embodiments, the vehicle 205 may utilize a combination of GPS and Dead Reckoning responsive to determining that a threshold number of satellites are not recognized. The GPS 275 may provide means for vehicle sensory system information that can include a present localization of the vehicle 205, trip destination information, average vehicle speeds, traffic information, and/or other real-time information.

The automotive computer 245 may be or include an electronic vehicle controller, having one or more processor(s) 250 and memory 255. The automotive computer 245 may, in some example embodiments, be disposed in communication with the mobile device 220, and one or more server(s) 270. The server(s) 270 may be part of a cloud-based computing infrastructure, and may be associated with and/or include a Telematics Service Delivery Network (SDN) that provides digital data services to the vehicle 205 and other vehicles (not shown in FIG. 2) that may be part of a vehicle fleet.

Although illustrated as a sport utility, the vehicle 205 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 205 may be configured as an electric vehicle (EV). More particularly, the vehicle 205 may include a battery EV (BEV) drive system, or be configured as a hybrid EV (HEV) having an independent onboard powerplant, a plug-in HEV (PHEV) that includes an HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 205 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 205 may be a manually driven vehicle, and/or be configured and/or programmed to operate in a fully autonomous (e.g., driverless) mode (e.g., Level-5 autonomy) or in one or more partial autonomy modes, which may include driver assist technologies.

The mobile device 220 can include a memory 223 for storing program instructions associated with an application 235 that, when executed by a mobile device processor 221, performs aspects of the disclosed embodiments. The application (or "app") 235 may be part of the roadway complexity awareness system 100, or may provide information to the roadway complexity awareness system 100 and/or receive information from the roadway complexity awareness system 100.

In some aspects, the mobile device 220 may communicate with the vehicle 205 through the one or more wireless connection(s) 230, which may be encrypted or non-encrypted, and established between the mobile device 220 and a Telematics Control Unit (TCU) 260. The mobile device 220 may communicate with the TCU 260 using a wireless transmitter (not shown in FIG. 2) associated with the TCU 260 on the vehicle 205. The transmitter may communicate with the mobile device 220 using a wireless communication network such as, for example, the one or more network(s) 225. The wireless connection(s) 230 are depicted in FIG. 2 as communicating via the one or more network(s) 225, and via one or more wireless connection(s) 233 that can be direct connection(s) between the vehicle 205 and the mobile device 220. The wireless connection(s) 233 may include various low-energy protocols, including, for example, Bluetooth®, Bluetooth® Low-Energy (BLE®), UWB, Near Field Communication (NFC), or other protocols.

The network(s) 225 illustrate an example communication infrastructure in which the connected devices discussed in various embodiments of this disclosure may communicate. The network(s) 225 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The automotive computer 245 and/or the roadway complexity awareness processor 208 may be installed in an engine compartment of the vehicle 205 (or elsewhere in the vehicle 205) and operate as a functional part of the roadway complexity awareness system 100, in accordance with the disclosure. The automotive computer 245 may include one or more processor(s) 250 and a computer-readable memory 255. Moreover, the roadway complexity awareness processor 208 may be separate from the automotive computer 245, or may be integrated as part of the automotive computer 245.

The one or more processor(s) 250 may be disposed in communication with one or more memory devices disposed in communication with the respective computing systems (e.g., the memory 255 and/or one or more external databases not shown in FIG. 2). The processor(s) 250 may utilize the memory 255 to store programs in code and/or to store data for performing aspects in accordance with the disclosure. The memory 255 may be a non-transitory computer-readable memory storing a roadway complexity awareness program code. The memory 255 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 265 may share a power bus 278 with the automotive computer 245, and may be configured and/or programmed to coordinate the data between vehicle 205 systems, connected servers (e.g., the server(s) 270), and other vehicles (not shown in FIG. 2) operating as part of a vehicle fleet. The VCU 265 can include or communicate with any combination of the ECUs 217, such as, for example, a Body Control Module (BCM) 293, an Engine Control Module (ECM) 285, a Transmission Control Module (TCM) 290, the TCU 260, a Driver Assistances Technologies (DAT) controller 299, etc. The VCU 265 may further include and/or communicate with a Vehicle Perception System (VPS) 281, having connectivity with and/or control of one or more vehicle sensory system(s) 282. In some aspects, the VCU 265 may control operational aspects of the vehicle 205, and implement one or more instruction sets received from the application 235 operating on the mobile device 220, from one or more instruction sets stored in computer memory 255 of the automotive computer 245, including instructions operational as part of the roadway complexity awareness system 100.

The TCU 260 can be configured and/or programmed to provide vehicle connectivity to wireless computing systems onboard and offboard the vehicle 205, and may include a Navigation (NAV) receiver 288 for receiving and processing a GPS signal from the GPS 275, a BLE® Module (BLEM) 295, a Wi-Fi transceiver, a UWB transceiver, and/or other wireless transceivers (not shown in FIG. 2) that may be configurable for wireless communication between the vehicle 205 and other systems, computers, and modules. The TCU 260 may be disposed in communication with the ECUs 217 by way of a bus 280. In some aspects, the TCU 260 may retrieve data and send data as a node in a CAN bus.

According to other embodiments, the TCU 260 may provide connectivity to infrastructure elements in the driving environment, such as roadside computing modules (not shown), that are stationary devices operating as part of the roadway infrastructure. In other aspects, the infrastructure devices may be associated with roadway signs, barriers, or other devices, and provide information to the TCU such as roadway complexity information, roadway status information, route change information, and/or the like.

The BLEM 295 may establish wireless communication using Bluetooth® and BLE® communication protocols by broadcasting and/or listening for broadcasts of small advertising packets, and establishing connections with responsive devices that are configured according to embodiments described herein. For example, the BLEM 295 may include Generic Attribute Profile (GATT) device connectivity for client devices that respond to or initiate GATT commands and requests, and connect directly with the mobile device 220.

The bus 280 may be configured as a Controller Area Network (CAN) bus organized with a multi-master serial bus standard for connecting two or more of the ECUs 217 as nodes using a message-based protocol that can be configured and/or programmed to allow the ECUs 217 to communicate with each other. The bus 280 may be or include a high speed CAN (which may have bit speeds up to 1 Mb/s on CAN, 5 Mb/s on CAN Flexible Data Rate (CAN FD)), and can include a low-speed or fault-tolerant CAN (up to 125 Kbps), which may, in some configurations, use a linear bus configuration. In some aspects, the ECUs 217 may communicate with a host computer (e.g., the automotive computer 245, the roadway complexity awareness system 100, and/or the server(s) 270, etc.), and may also communicate with one another without the necessity of a host computer. The bus 280 may connect the ECUs 217 with the automotive computer 245 such that the automotive computer 245 may retrieve information from, send information to, and otherwise interact with the ECUs 217 to perform steps described according to embodiments of the present disclosure. The bus 280 may connect CAN bus nodes (e.g., the ECUs 217) to each other through a two-wire bus, which may be a twisted pair having a nominal characteristic impedance. The bus 280 may also be accomplished using other communication protocol solutions, such as Media Oriented Systems Transport (MOST) or Ethernet. In other aspects, the bus 280 may be a wireless intra-vehicle bus.

The VCU 265 may control various loads directly via the bus 280 communication or implement such control in conjunction with the BCM 293. The ECUs 217 described with respect to the VCU 265 are provided for example purposes only, and are not intended to be limiting or exclusive. Control and/or communication with other control modules not shown in FIG. 2 is possible, and such control is contemplated.

In an example embodiment, the ECUs 217 may control aspects of vehicle operation and communication using inputs from human drivers, inputs from an autonomous vehicle controller, the roadway complexity awareness system 100, and/or via wireless signal inputs received via the wireless connection(s) 233 from other connected devices such as the mobile device 220, among others. The ECUs 217, when configured as nodes in the bus 280, may each include a central processing unit (CPU), a CAN controller, and/or a transceiver (not shown in FIG. 2). For example, although the mobile device 220 is depicted in FIG. 2 as connecting to the vehicle 205 via the BLEM 295, it is possible and contemplated that the wireless connection 233 may also or alternatively be established between the mobile device 220 and one or more of the ECUs 217 via the respective transceiver(s) associated with the module(s).

The BCM 293 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 293 may also operate as a gateway for bus and network interfaces to interact with remote ECUs (not shown in FIG. 2).

The BCM 293 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 293 may be configured for vehicle energy management, exterior lighting control, wiper functionality, power window, and door functionality, heating ventilation and air conditioning systems, and driver integration systems. In other aspects, the BCM 293 may control auxiliary equipment functionality, and/or be responsible for integration of such functionality.

The DAT controller 299 may provide Level-1 through Level-3 automated driving and driver assistance functionality that can include, for example, active parking assistance, trailer backup assistance, adaptive cruise control, lane keeping, and/or driver status monitoring, among other features. The DAT controller 299 may also provide aspects of user and environmental inputs usable for user authentication. Authentication features may include, for example, biometric authentication and recognition.

The DAT controller 299 can obtain input information via the sensory system(s) 282, which may include sensors disposed on the vehicle interior and/or exterior (sensors not shown in FIG. 2). The DAT controller 299 may receive the sensor information associated with driver functions, vehicle functions, and environmental inputs, and other information. The DAT controller 299 may characterize the sensor information for identification of biometric markers stored in a secure biometric data vault (not shown in FIG. 2) onboard the vehicle 205 and/or via the server(s) 270.

In other aspects, the DAT controller 299 may also be configured and/or programmed to control Level-1 and/or Level-2 driver assistance when the vehicle 205 includes Level-1 or Level-2 autonomous vehicle driving features. The DAT controller 299 may connect with and/or include a Vehicle Perception System (VPS) 281, which may include internal and external sensory systems (collectively referred to as sensory systems 281). The sensory systems 282 may be configured and/or programmed to obtain sensor data usable for biometric authentication, and for performing driver assistances operations such as, for example, active parking, trailer backup assistances, adaptive cruise control, and lane keeping, driver status monitoring, and/or other features.

For example, the DAT controller 299 may determine driver information indicative of one or more driver characteristics such as driver age, a driving experience estimation value for the vehicle operator, and/or a driving attention value indicative of a present amount of attention the vehicle operator gives to operating the vehicle. The DAT controller 299 may determine driver age by identifying a particular driver via biometric authentication, via a fob (not shown) associated with the driver (user 150), or via other means known in the art for personally identifying driver identification characteristics.

In another aspect, the DAT controller may estimate driving experience based on driver age and other factors such as a driver license number, driver profile information provided to the application using a vehicle or external computer, or via other means such as observation of driving characteristics such as braking actions per minute, steering actions per minute, and use history of that driver with the vehicle 205.

According to another embodiment, the roadway complexity awareness processor 208, although shown in FIG. 2 as connecting to the bus 280, may be integrated with and/or executed as part of the DAT 299. For example, the DAT 299 may receive roadway status information from an infrastructure processor associated with the roadway, obtain sensory information from the VPS 281 indicative of roadway route complexity, and determine a likelihood of roadway route complexity based on the roadway status information and the sensory information. In other aspects, the DAT 299 may select an AR message indicative of the roadway route complexity and generate the AR message using an AR interface, where the AR message is visible to the user 150 using an augmented reality interface device 246. The DAT 299 may also determine other information such as current weather conditions and time of day, which may be used for determining roadway complexity likelihood values that serve as inputs for selection of the AR message intensity level to be delivered to the vehicle user 150 via a heads-up display 247, or using a wearable or non-wearable AR rendering device (not shown in FIG. 2).

The computing system architecture of the automotive computer 245, the VCU 265, and/or the roadway complexity awareness system 100 may omit certain computing modules. It should be readily understood that the computing environment depicted in FIG. 2 is an example of a possible implementation according to the present disclosure, and thus, it should not be considered limiting or exclusive.

The roadway complexity awareness processor 208, regardless of whether it is integrated with the automotive computer 245, the DAT 299, another of the VCU 265, or operate as an independent computing system in the vehicle 205, may include a processor 249, and a computer-readable memory 248. The processor 249 may instantiate one or more modules such as the UEG 145, the TAF module 135, and/or the RCR determination module 125 based on instruction sets stored in the memory 248.

The automotive computer 245 may connect with an infotainment system 210 that may provide an interface for the navigation and GPS receiver, and the roadway complexity awareness system 100. The infotainment system 210 may include a touchscreen interface portion 211, and may include voice recognition features, biometric identification capabilities that can identify users based on facial recognition, voice recognition, fingerprint identification, or other biological identification means. In other aspects, the infotainment system 210 may provide user identification using mobile device pairing techniques (e.g., connecting with the mobile device 220, a Personal Identification Number (PIN)) code, a password, passphrase, or other identifying means.

Figure 3:
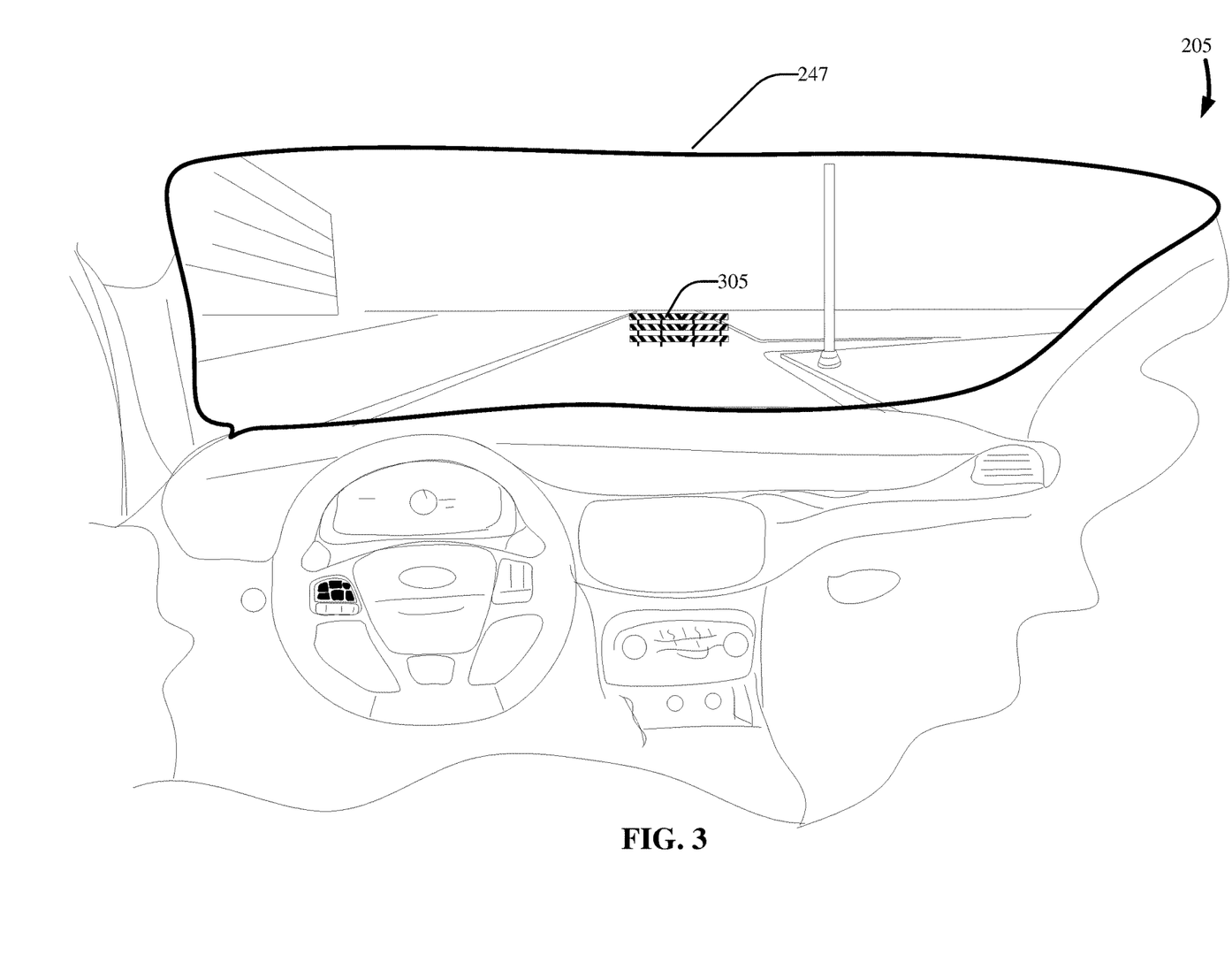
FIG. 3 depicts an example view of a roadway as observed by a user of the vehicle in accordance with the present disclosure.

FIG. 3 depicts an example view of a roadway as observed by a user (not shown in FIG. 3 for clarity) of the vehicle 205 in accordance with the present disclosure. A heads-up display 247 disposed proximate to or integrated a vehicle windshield may allow a direct view of approaching roadway complexities 305, which are provided in the example of FIG. 3 as a road block that will force a stop or a right turn as the vehicle approaches the position of the roadway complexity 305.

Figure 4:
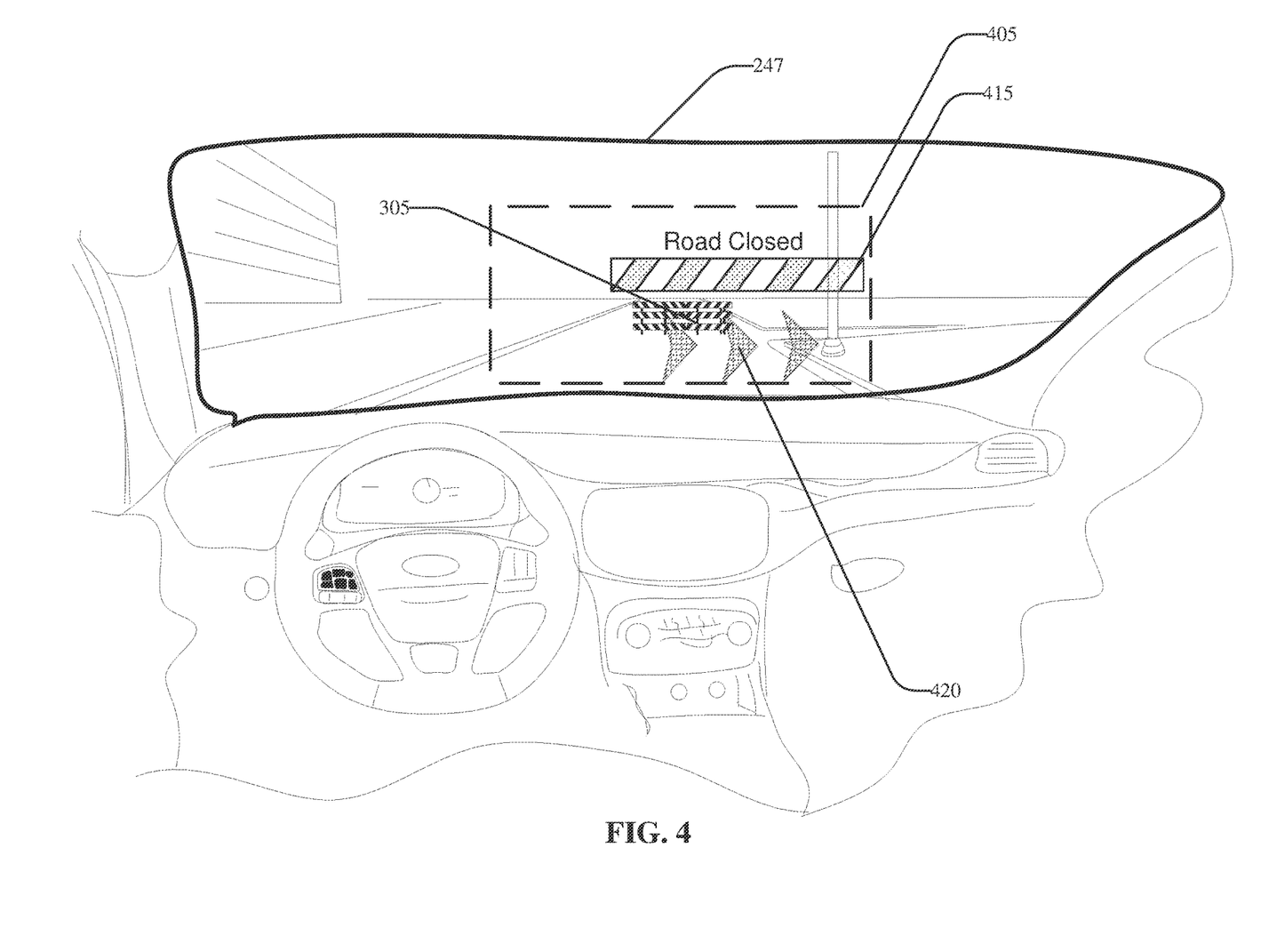
FIG. 4 depicts an example message delivered to a vehicle operator using the system of FIG. 1 in accordance with the present disclosure.

FIG. 4 depicts an example message delivered to a vehicle operator (not shown in FIG. 4) using the roadway complexity awareness system 100, in accordance with the present disclosure. For example, as the vehicle 205 approaches the roadway complexity 305, the roadway complexity awareness system 100 may output an AR message 405 using the AR interface device 246, where the AR message is visible to the user 150. For example, the AR message may include a written description of the roadway complexity (in the present example, "Road Closed"), a symbol or graphic demonstrating the type of complexity (e.g., the road barrier representation 415), and/or directional graphics or animations 420 that indicate recommended vehicle actions (e.g., turn right or left, veer right or left, stop vehicle, slow vehicle, etc.

Figure 5:
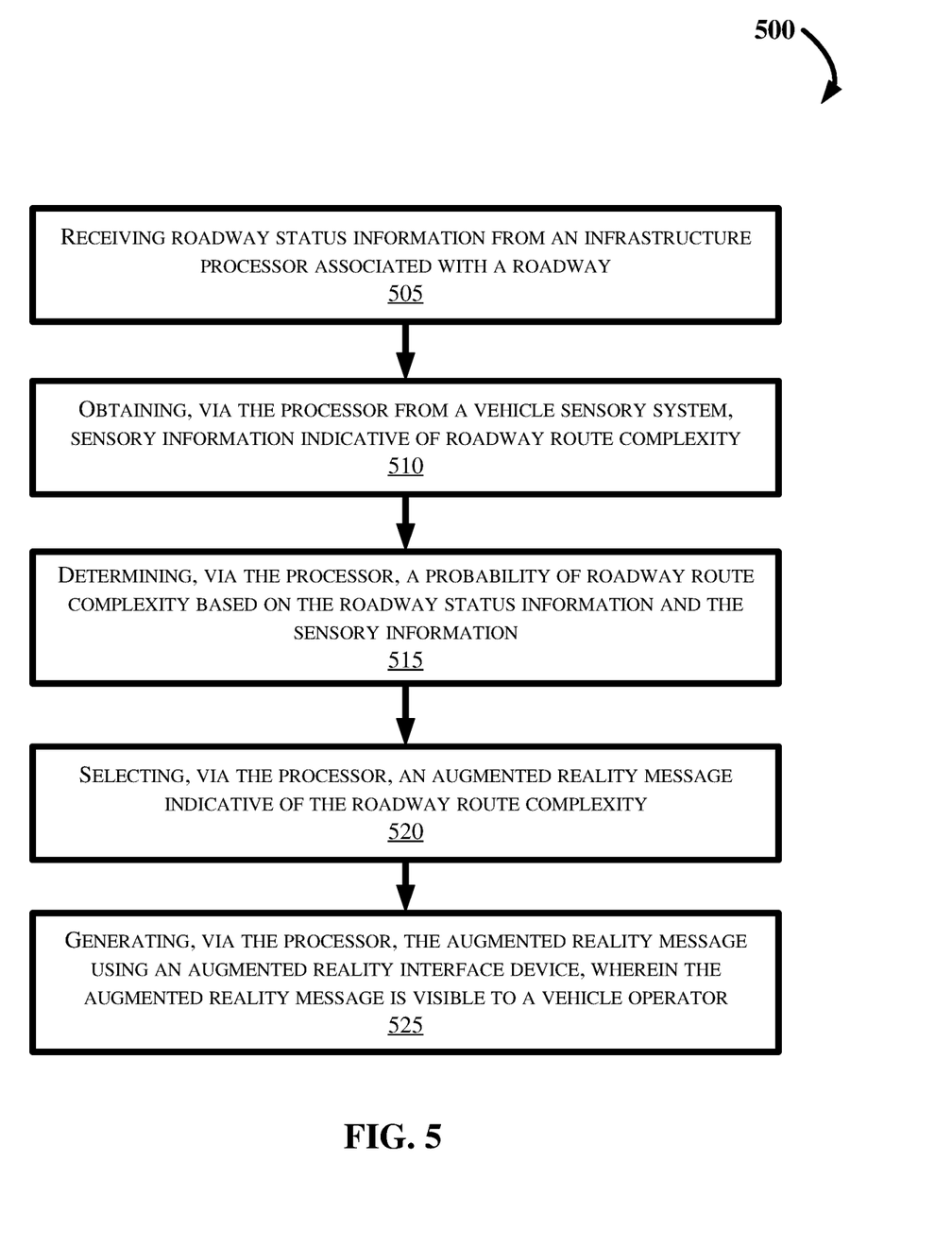
FIG. 5 depicts a flow diagram of an example method for generating an augmented reality message using the system of FIG. 1 in accordance with the present disclosure.

FIG. 5 depicts a flow diagram of an example method for generating an augmented reality message using the system of FIG. 1 in accordance with the present disclosure.

FIG. 5 is a flow diagram of an example method 500 for controlling a roadway complexity awareness system in a vehicle, according to the present disclosure. FIG. 5 may be described with continued reference to prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

Referring first to FIG. 5, at step 505, the method 500 may commence with receiving roadway status information from an infrastructure processor associated with a roadway.

At step 510, the method 500 may further include obtaining, via the processor from a vehicle sensory system, sensory information indicative of roadway route complexity. This step may include receiving, from an I2V device, information indicative of the type of roadway complexity, location of the roadway complexity, and other information. According to another embodiment, the system may obtain information indicative of the roadway complexity using onboard sensors that may not be connected to I2V computing systems. For example, the VPS may determine the presence of a sign, barrier, vehicle collision, or other sensory information that indicates presence and location of roadway complexity.

According to another embodiment, the roadway complexity may be received via a vehicle-to-vehicle information network (not shown), where a proximate vehicle determines the presence of the road complexity and passes that information to the vehicle 205.

At step 515, the method 500 may further include determining, via the processor, a likelihood of roadway route complexity based on the roadway status information and the sensory information. This step may include receiving vehicle operation data comprising one or more of a vehicle speed, a steering action, and a brake action. For example, the processor 249 may cause the RCR determination module 124 to obtain, from the VPS 281, the vehicle speed, steering action information, and brake action information. In another aspect, this step may include receiving, via the processor, route information comprising a trip destination and a present localization of the vehicle.

In one example, the RCR determination module may obtain, via the TCU, present vehicle localization, determine time-to-roadway calculations, and determine other conditions such as weather conditions to provide predictive information to the TAF module 135.

In another aspect this step may include obtaining, via the processor, driver information indicative of one or more driver characteristics. Accordingly, this stem may further include generating, using the vehicle operation data, the route information, and the driver information, a roadway complexity value indicative of the likelihood of roadway route complexity.

This step may further include determining the age of the vehicle operator, determining a driving experience estimation value for the vehicle operator, and determining a driving attention value indicative of a present amount of attention the vehicle operator gives to operating the vehicle. The information may be used for determining, based on a relative localization and the route information that the vehicle is approaching an area associated with the roadway complexity, and determining the roadway complexity likelihood value based on the relative localization and the route information.

At step 520, the method 500 may further include selecting, via the processor, an augmented reality message indicative of the roadway route complexity. This step may include selecting the message intensity level based on one or more of selecting the augmented reality message comprises:

Selecting, via the processor, a message intensity level based on one of a low time to the roadway complexity, a medium time to the roadway complexity, and a high time to roadway complexity.

At step 525, the method 500 may further include generating, via the processor, the augmented reality message using an augmented reality interface device, wherein the augmented reality message is visible to a vehicle operator. This step may include displaying the AR message on an AR heads-up display of the vehicle, and/or displaying the AR message using one or more connected wearable or non-wearable AR devices.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is That which is claimed is:

1. A method for controlling a vehicle to provide roadway complexity awareness messages, comprising:
   receiving roadway status information from an infrastructure processor associated with a roadway, wherein the infrastructure processor comprises a device that is stationary, with respect to the vehicle, and wherein the roadway status information comprises at least one of traffic barrier information, road shift information, and vehicle collision information;
   obtaining, via a vehicle sensory system, sensory information indicative of roadway route complexity;
   determining, via a vehicle processor, a likelihood of roadway route complexity based on the roadway status information and the sensory information;
   selecting, via the vehicle processor, an augmented reality message indicative of the roadway route complexity; and
   generating, via the vehicle processor, the augmented reality message using an augmented reality interface device, wherein the augmented reality message is visible to a vehicle operator,
   wherein determining the likelihood of roadway route complexity comprises:
   receiving vehicle operation data comprising a vehicle speed, a steering action, and a brake action;
   receiving, via the vehicle processor, roadway complexity information from the infrastructure processor providing infrastructure-to-vehicle communication associated with the roadway;
   receiving, via the vehicle processor, route information comprising a trip destination and a present localization of the vehicle;
   obtaining, via the vehicle processor, driver information indicative of an age of the vehicle operator, a driving experience estimation value for the vehicle operator, and a driving attention value indicative of a present amount of attention the vehicle operator gives to operating the vehicle; and
   generating, by fusing the vehicle operation data, information from the infrastructure-to-vehicle communication, the route information, and the driver information, a roadway complexity value indicative of the likelihood of roadway route complexity so that the augmented reality message is tailored to the vehicle, the vehicle operator, and an environment in which the vehicle is operating.

2. The method according to claim 1, further comprising:
   determining, based on a relative localization and the route information that the vehicle is approaching an area associated with the roadway route complexity; and
   determining the roadway complexity likelihood value based on the relative localization and the route information.

3. The method according to claim 2, further comprising:
   determining a time of day; and
   determining the roadway complexity likelihood value further based on the time of day.

4. The method according to claim 2, further comprising:
   determining a weather condition; and
   determining the roadway complexity likelihood value further based on the weather condition.

5. The method according to claim 1, wherein selecting, via the vehicle processor, the augmented reality message comprises:
   selecting, via the vehicle processor, a message intensity level based on one of:
   a low time to the roadway route complexity;
   a medium time to the roadway route complexity; and
   a high time to roadway route complexity.

6. The method according to claim 1, wherein the infrastructure processor is associated with a barrier on the roadway.

7. The method according to claim 1, wherein the infrastructure processor is associated with a sign on the roadway.

8. A roadway complexity awareness system for a vehicle, comprising:
   a vehicle processor;
   an augmented reality interface disposed in communication with the vehicle processor; and
   a memory for storing executable instructions, the vehicle processor programmed to execute the instructions to:
   receive roadway status information from an infrastructure processor associated with a roadway, wherein the infrastructure processor comprises a device that is stationary, with respect to the vehicle, and wherein the roadway status information comprises at least one of traffic barrier information, road shift information, and vehicle collision information;
   obtain, from a vehicle sensory system, sensory information indicative of roadway route complexity;
   determine a likelihood of roadway route complexity based on the roadway status information and the sensory information;
   select an augmented reality message indicative of the roadway route complexity; and
   generate the augmented reality message using an augmented reality interface device, wherein the augmented reality message is visible to a vehicle operator,
   wherein determine the likelihood of roadway route complexity comprises:
   receive vehicle operation data comprising a vehicle speed, a steering action, and a brake action;
   receive, via the vehicle processor, roadway complexity information from the infrastructure processor providing infrastructure-to-vehicle communication associated with the roadway;
   receive, via the vehicle processor, route information comprising a trip destination and a present localization of the vehicle;
   obtain, via the vehicle processor, driver information indicative of an age of the vehicle operator, a driving experience estimation value for the vehicle operator, and a driving attention value indicative of a present amount of attention the vehicle operator gives to operating the vehicle; and
   generate, by fusing the vehicle operation data, information from the infrastructure-to-vehicle communication, the route information, and the driver information, a roadway complexity value indicative of the likelihood of roadway route complexity so that the augmented reality message is tailored to the vehicle, the vehicle operator, and an environment in which the vehicle is operating.

9. The system according to claim 8, wherein the vehicle processor is further programmed to execute the instructions to:

determine, based on a relative localization and the route information that the vehicle is approaching an area associated with the roadway route complexity; and determine the roadway complexity likelihood value based on the relative localization and the route information.

10. The system according to claim 9, wherein the vehicle processor is further programmed to execute the instructions to:

determine a time of day; and determine the roadway complexity likelihood value further based on the time of day.

11. The system according to claim 9, wherein the vehicle processor is further programmed to execute the instructions to:

determine a weather condition; and determine the roadway complexity likelihood value further based on the weather condition.

12. The system according to claim 8, wherein the vehicle processor is further programmed to select the augmented reality message indicative of the roadway route complexity by executing the instructions to:

select a message intensity level based on one of:

a low time to the roadway route complexity;

a medium time to the roadway route complexity; and a high time to roadway route complexity.

13. A non-transitory computer-readable storage medium in a roadway complexity awareness processor, the computer-readable storage medium having instructions stored thereupon which, when executed by the roadway complexity awareness processor, cause the roadway complexity awareness processor to:

receive roadway status information from an infrastructure processor associated with a roadway, wherein the infrastructure processor comprises a device that is stationary, with respect to the roadway complexity awareness processor, and wherein the roadway status information comprises at least one of traffic barrier information, road shift information, and vehicle collision information;

obtain, from a vehicle sensory system, sensory information indicative of roadway route complexity;

determine a likelihood of roadway route complexity based on the roadway status information and the sensory information;

select an augmented reality message indicative of the roadway route complexity; and generate the augmented reality message using an augmented reality interface, wherein the augmented reality message is visible to a vehicle operator, wherein determine the likelihood of roadway route complexity comprises:

receive vehicle operation data comprising a vehicle speed, a steering action, and a brake action;

receive, via the vehicle processor, roadway complexity information from the infrastructure processor providing infrastructure-to-vehicle communication associated with the roadway;

receive, via the vehicle processor, route information comprising a trip destination and a present localization of the vehicle;

obtain, via the vehicle processor, driver information indicative of an age of the vehicle operator, a driving experience estimation value for the vehicle operator, and a driving attention value indicative of a present amount of attention the vehicle operator gives to operating the vehicle; and generate, by fusing the vehicle operation data, information from the infrastructure-to-vehicle communication, the route information, and the driver information, a roadway complexity value indicative of the likelihood of roadway route complexity so that the augmented reality message is tailored to the vehicle, the vehicle operator, and an environment in which the vehicle is operating.

14. The non-transitory computer-readable storage medium according to claim 13, having further instructions stored thereupon to:

determine, based on a relative localization and the route information that the vehicle is approaching an area associated with the roadway route complexity; and determine the roadway complexity likelihood value based on the relative localization and the route information.

15. The non-transitory computer-readable storage medium according to claim 14, having further instructions stored thereupon to:

determine a time of day; and determine the roadway complexity likelihood value further based on the time of day.

16. The non-transitory computer-readable storage medium according to claim 13, having further instructions stored thereupon to:

select a message intensity level based on one of:

a low time to the roadway route complexity;

a medium time to the roadway route complexity; and a high time to roadway route complexity.

* * * * *